Patented June 11, 1929.

1,716,665

UNITED STATES PATENT OFFICE.

LAWRENCE V. REDMAN, OF CALDWELL, NEW JERSEY, AND VICTOR H. TURKINGTON, OF CHICAGO, ILLINOIS, ASSIGNORS TO BAKELITE CORPORATION, OF NEW YORK, N. Y., A CORPORATION OF DELAWARE.

PHENOL-RESIN MOLDING MIXTURE.

No Drawing.   Application filed May 1, 1923. Serial No. 635,977.

This invention relates to molding mixtures of the phenol resin type, such mixtures comprising, as is well known, a phenol resin of the potentially reactive type, and a filling material, which is usually fibrous in character, as wood-flour. These mixtures are commonly employed in the familiar hot-molding process, the potentially reactive resin being transformed during the molding operation to the infusible resin which constitutes the binder of the finished article. Molding mixtures are also employed in accordance with the so-called cold-molding process, in which the shaping is effected under heavy pressure but at ordinary temperatures, or at temperatures below the transformation point of the resin, the shaped articles being thereafter baked in suitable ovens to effect or to complete the transformation. The invention comprises also the molded article. It is necessary that all such molding mixtures should have a certain flowing quality or plasticity at the shaping temperature; and since this flowing quality is a function of the resin, as distinguished from the filler, it has been necessary heretofore to maintain a fixed and rather high proportion of resin to filler to afford the proper flowing quality in the mixture. This proportion may vary somewhat, but for wood-flour-resin molding mixtures rather closely approximates 1:1 or 50:50 ratio. It will readily be understood that on account of the relatively high cost of the resin as compared with the wood-flour, such high resin mixtures are necessarily comparatively expensive.

We have now discovered that certain plasticizing agents which are also resin solvents, including aldehydes of high molecular weight, and more especially furfuraldehyde (furfural), when combined even in relatively small proportion with the potentially reactive resin of the known phenolmethylene type, and with the usual fillers, exert an extraordinary and unexpected influence upon the flowing quality of the resulting mixtures. For example we have found that a molding mixture containing about 25% of the potentially reactive resin, about 20% of furfural and about 55% of wood-flour exhibits substantially the same flowing quality as the standard mixture containing 50% of wood-flour and 50% of resin. With a resin content of about 30%, a fiber content of about 50%, and 20% of furfural, excellent flowing quality is secured in the mixture. In general, our invention in its preferred embodiment contemplates the preparation of molding mixtures containing, say 50 per cent or upward by weight of the fibrous filler, usually wood-flour; about 25 to 40 per cent of the phenolic resin; and the furfural or equivalent plasticizer in sufficient proportion, usually of the order 15–25 per cent, to impart the requisite flowing quality.

The expression "potentially reactive phenolic resin" is used herein to include all such products of the phenol-methylene type as are initially fusible and soluble but are directly transformed by sufficient heating into an infusible state. These potentially reactive compositions are readily prepared for example by incorporating with phenolic resin of the permanently fusible and soluble type sufficient hexamethylenetetramine or equivalent methylene-containing body to effect its transformation, under the influence of heat, to a resin of the infusible type.

When hexamethylenetetramine is used as the hardening agent, or when the initial condensation of the phenols and formaldehyde or their equivalents is accomplished by the aid of ammonia as a catalytic or condensing agent, some ammonia is set free during the final transformation; and it is a special advantage of furfural used in this relation that it is capable of binding this ammonia, with the initial formation of furfuramid, which on sufficient further heating passes over to the nitrogenous resinous body, furfurin, which constitutes an element of the final binder. Benzaldehyde acts in an essentially similar manner.

Although furfural is the best material known to us for the purposes of this invention, our invention is not limited thereto since it may be replaced in whole or in part by other organic bodies having a high boiling point, a highly developed solvent effect upon the initial resins, and, for the best results, an aldehyde character, as for example benzaldehyde, hexoic aldehyde, iso-hexyl aldehyde, mannoheptose, methyl-furfural and others of analogous nature. All such materials are herein broadly referred to as high-boiling alhehydes, and to the extent to which they are capable of replacing furfural for the purposes of this invention are to be regarded as equivalents thereof.

The term "high boiling aldehyde" is applied herein to such aldehydes as those mentioned above, which have a boiling point substantially above that of formaldehyde or acetaldehyde. Furfural (boiling point about 160° C.) is particularly advantageous since its boiling point lies above the temperature at which cold-molded articles are usually cured.

We claim:

1. The hereindescribed novel molding mixture comprising a potentially reactive phenolic resin, a filling material, and a high-boiling aldehyde, said molding mixture containing a substantially greater proportion of filling material and a substantially less proportion of phenolic resin than corresponds to a 1:1 ratio, together with sufficient high-boiling aldehyde to impart to the mixture the requisite flowing quality.

2. The hereindescribed novel molding mixture comprising a potentially reactive phenolic resin, a filling material, and furfural, said molding mixture containing a substantially gerater proportion of filling material and a substantially less proportion of phenolic resin than corresponds to a 1:1 ratio, together with sufficient furfural to impart to the mixture the requisite flowing quality.

3. The hereindescribed novel molding mixture comprising 50% or upward of a fibrous filling material, about 25% to 40% of a potentially reactive resin, and furfural in proportion to impart to the mixture the requisite flowing quality.

4. The hereindescribed novel molding mixture comprising about 50–55% of wood-flour, about 25–30% of a potentially reactive resin, the balance principally a high-boiling aldehyde.

5. The hereindescribed novel molding mixture comprising about 50–55% of wood-flour, about 25–30% of a potentially reactive resin, the balance principally furfural.

6. The hereindescribed novel molded article comprising 50% or upward of a fibrous filling material, about 25% to 40% of an infusible phenolic resin, and a third component comprising furfural or a reaction product thereof.

7. The hereindescribed novel molded article comprising 50% or upward of a fibrous filling material, about 25% to 40% of an infusible phenolic resin, and a third component comprising a nitrogen derivative of a high-boiling aldehyde.

8. The hereindescribed novel molding mixture comprising a potentially reactive phenolic resin, a fibrous filling material, and a third component in proportion to impart to the mixture the requisite flowing quality; said molding mixture containing a substantially greater proportion of filling material and a substantially less proportion of phenolic resin than corresponds to a 1:1 ratio; and said third component possessing a high boiling point, an aldehyde character, and being a solvent for the initial resin.

In testimony whereof, we affix our signatures.

LAWRENCE V. REDMAN.
VICTOR H. TURKINGTON.